US009225979B1

(12) United States Patent
Jia et al.

(10) Patent No.: US 9,225,979 B1
(45) Date of Patent: Dec. 29, 2015

(54) REMOTE ACCESS ENCODING

(71) Applicants: Wei Jia, San Jose, CA (US); Qunshan Gu, Hayward, CA (US)

(72) Inventors: Wei Jia, San Jose, CA (US); Qunshan Gu, Hayward, CA (US)

(73) Assignee: GOOGLE INC., Mountain View, CA (US)

(*) Notice: Subject to any disclaimer, the term of this patent is extended or adjusted under 35 U.S.C. 154(b) by 417 days.

(21) Appl. No.: 13/753,632

(22) Filed: Jan. 30, 2013

(51) Int. Cl.
*H04B 1/66* (2006.01)
*H04N 7/12* (2006.01)
*H04N 11/02* (2006.01)
*H04N 11/04* (2006.01)
*H04N 19/10* (2014.01)

(52) U.S. Cl.
CPC ................................ *H04N 19/00006* (2013.01)

(58) Field of Classification Search
None
See application file for complete search history.

(56) References Cited

U.S. PATENT DOCUMENTS 4,924,310 A 5/1990 von Brandt
5,148,269 A 9/1992 de Haan et al.
5,337,086 A 8/1994 Fujinami
5,398,068 A 3/1995 Liu et al.
5,452,435 A 9/1995 Malouf et al.
5,512,952 A 4/1996 Iwamura
5,638,114 A 6/1997 Hatanaka et al.
5,731,840 A 3/1998 Kikuchi et al.
5,801,756 A 9/1998 Iizawa
5,870,146 A * 2/1999 Zhu .......................... 375/240.03
5,886,742 A 3/1999 Hibi et al.
5,916,449 A 6/1999 Ellwart et al.
5,930,387 A 7/1999 Chan et al.
5,991,447 A 11/1999 Eifrig et al.
6,005,625 A 12/1999 Yokoyama (Continued)

FOREIGN PATENT DOCUMENTS

EP 0634873 B1 9/1998
EP 1777969 4/2007

(Continued)

OTHER PUBLICATIONS

Ahn et al., Flat-region Detection and False Contour Removal in the Digital TV Display, http://cilab.knu.ac.kr/seminar/Seminar/2012/20121013%20Flat-region%20Detection%20And%20False%20Contour%20Removal%20In%20The%20Digital%20TV%20Display.pdf. Dec. 12, 2012.

(Continued)

*Primary Examiner* — Joseph Ustaris
*Assistant Examiner* — Talha Nawaz
(74) *Attorney, Agent, or Firm* — Young Basile, Hanlon & MacFarlane P.C.

(57) ABSTRACT

A method and apparatus for remote access encoding is provided. Remote access encoding may include receiving, at a host device, from a client device, a remote access request indicating a portion of a display area of an operating environment of the host device, rendering a representation of the portion of the display area, wherein rendering includes generating rendered content including a plurality of frames, generating an encoded block, and transmitting encoded content to the client device, wherein the encoded content includes the encoded block. Generating the encoded block may include identifying a current block from a plurality of blocks in a current frame, wherein the current frame is one of the plurality of frames, determining whether the current block is a static block, determining a coding quality for encoding the current block, and determining whether to encode the current block as a skipped block.

17 Claims, 7 Drawing Sheets

640 610 NETWORK 630 640A 622 620

(56) References Cited

U.S. PATENT DOCUMENTS 6,005,980 A 12/1999 Eifrig et al.
6,021,213 A 2/2000 Helterbrand et al.
6,025,870 A 2/2000 Hardy
6,044,166 A 3/2000 Bassman et al.
6,058,211 A 5/2000 Bormans et al.
6,075,554 A * 6/2000 Andrews et al. ........... 348/14.08
6,091,777 A 7/2000 Guetz et al.
6,195,391 B1 2/2001 Hancock et al.
6,204,847 B1 3/2001 Wright
6,243,683 B1 6/2001 Peters
6,266,337 B1 7/2001 Marco
6,271,840 B1 8/2001 Finseth et al.
6,272,179 B1 8/2001 Kadono
6,289,049 B1 9/2001 Kim et al.
6,346,963 B1 2/2002 Katsumi
6,359,929 B1 3/2002 Boon
6,363,067 B1 3/2002 Chung
6,363,119 B1 3/2002 Oami
6,381,277 B1 4/2002 Chun et al.
6,421,387 B1 7/2002 Rhee
6,462,791 B1 10/2002 Zhu
6,483,454 B1 11/2002 Torre et al.
6,556,588 B2 4/2003 Wan et al.
6,577,333 B2 6/2003 Tai et al.
6,587,985 B1 7/2003 Fukushima et al.
6,681,362 B1 1/2004 Abbott et al.
6,684,354 B2 1/2004 Fukushima et al.
6,707,852 B1 3/2004 Wang
6,711,209 B1 3/2004 Lainema et al.
6,728,317 B1 4/2004 Demos
6,732,313 B2 5/2004 Fukushima et al.
6,735,249 B1 5/2004 Karczewicz et al.
6,741,569 B1 5/2004 Clark
6,812,956 B2 11/2004 Ferren et al.
6,816,836 B2 11/2004 Basu et al.
6,918,077 B2 7/2005 Fukushima et al.
6,952,450 B2 10/2005 Cohen
7,007,098 B1 2/2006 Smyth et al.
7,007,235 B1 2/2006 Hussein et al.
7,015,954 B1 3/2006 Foote et al.
7,114,129 B2 9/2006 Awada et al.
7,124,333 B2 10/2006 Fukushima et al.
7,178,106 B2 2/2007 Lamkin et al.
7,180,896 B1 2/2007 Okumura
7,197,070 B1 3/2007 Zhang et al.
D541,293 S 4/2007 Harvey et al.
7,219,062 B2 5/2007 Colmenarez et al.
7,263,644 B2 8/2007 Park et al.
7,266,782 B2 9/2007 Hull et al.
D553,632 S 10/2007 Harvey et al.
7,356,750 B2 4/2008 Fukushima et al.
7,372,834 B2 5/2008 Kim et al.
7,376,880 B2 5/2008 Ichiki et al.
7,379,653 B2 5/2008 Yap et al.
7,424,056 B2 9/2008 Lin et al.
7,447,235 B2 11/2008 Luby et al.
7,447,969 B2 11/2008 Park et al.
7,484,157 B2 1/2009 Park et al.
D594,872 S 6/2009 Akimoto
7,577,898 B2 8/2009 Costa et al.
7,636,298 B2 12/2009 Miura et al.
7,664,185 B2 2/2010 Zhang et al.
7,664,246 B2 2/2010 Krantz et al.
7,680,076 B2 3/2010 Michel et al.
7,684,982 B2 3/2010 Taneda
D614,646 S 4/2010 Chen et al.
7,707,224 B2 4/2010 Chastagnol et al.
7,710,973 B2 5/2010 Rumbaugh et al.
7,720,686 B2 5/2010 Volk et al.
7,735,111 B2 6/2010 Michener et al.
7,739,714 B2 6/2010 Guedalia
7,756,127 B2 7/2010 Nagai et al.
7,797,274 B2 9/2010 Strathearn et al.
7,822,607 B2 10/2010 Aoki et al.
7,823,039 B2 10/2010 Park et al.
7,860,718 B2 12/2010 Lee et al.
7,864,210 B2 1/2011 Kennedy
7,974,243 B2 7/2011 Nagata et al.
8,010,185 B2 8/2011 Ueda
8,019,175 B2 9/2011 Lee et al.
8,060,651 B2 11/2011 Deshpande et al.
8,078,493 B2 12/2011 Rosenberg et al.
8,085,767 B2 12/2011 Lussier et al.
8,087,056 B2 12/2011 Ryu
8,130,823 B2 3/2012 Gordon et al.
8,161,159 B1 4/2012 Shetty et al.
8,175,041 B2 5/2012 Shao et al.
8,176,524 B2 5/2012 Singh et al.
8,179,983 B2 5/2012 Gordon et al.
8,223,268 B2 7/2012 Fujiwara et al.
8,233,539 B2 7/2012 Kwon
8,265,450 B2 9/2012 Black et al.
8,307,403 B2 11/2012 Bradstreet et al.
8,316,450 B2 11/2012 Robinson et al.
8,443,398 B2 5/2013 Swenson et al.
8,448,259 B2 5/2013 Haga et al.
8,494,053 B2 7/2013 He et al.
8,553,776 B2 10/2013 Shi et al.
8,566,886 B2 10/2013 Scholl
8,649,668 B2 * 2/2014 Moorer ......................... 386/343
8,705,620 B1 4/2014 Jia
8,719,888 B1 5/2014 Xu et al.
8,804,819 B1 8/2014 Jia
9,026,615 B1 * 5/2015 Sirton et al. ................. 709/217
2002/0003575 A1 1/2002 Marchese
2002/0017565 A1 2/2002 Ju et al.
2002/0031272 A1 3/2002 Bagni et al.
2002/0085637 A1 7/2002 Henning
2002/0140851 A1 10/2002 Laksono
2002/0152318 A1 10/2002 Menon et al.
2002/0157058 A1 10/2002 Ariel et al.
2002/0176604 A1 11/2002 Shekhar et al.
2002/0191072 A1 12/2002 Henrikson
2003/0012281 A1 1/2003 Cho et al.
2003/0012287 A1 1/2003 Katsavounidis et al.
2003/0016630 A1 1/2003 Vega-Garcia et al.
2003/0053544 A1 3/2003 Yasunari et al.
2003/0061368 A1 3/2003 Chaddha
2003/0098992 A1 5/2003 Park et al.
2003/0112864 A1 * 6/2003 Karczewicz et al. .... 375/240.01
2003/0215135 A1 11/2003 Caron et al.
2003/0226094 A1 12/2003 Fukushima et al.
2003/0229822 A1 12/2003 Kim et al.
2003/0229900 A1 12/2003 Reisman
2004/0001634 A1 1/2004 Mehrotra
2004/0017939 A1 1/2004 Mehrotra
2004/0071170 A1 4/2004 Fukuda
2004/0105004 A1 6/2004 Rui et al.
2004/0165585 A1 8/2004 Imura et al.
2004/0172252 A1 9/2004 Aoki et al.
2004/0172255 A1 9/2004 Aoki et al.
2004/0184444 A1 9/2004 Aimoto et al.
2004/0196902 A1 10/2004 Faroudja
2004/0233938 A1 11/2004 Yamauchi
2004/0252886 A1 12/2004 Pan et al.
2004/0258158 A1 * 12/2004 Gordon .................... 375/240.24
2005/0033635 A1 2/2005 Jeon
2005/0041150 A1 2/2005 Gewickey et al.
2005/0071781 A1 3/2005 Atkins
2005/0076272 A1 4/2005 Delmas et al.
2005/0091508 A1 4/2005 Lee et al.
2005/0117653 A1 6/2005 Sankaran
2005/0125734 A1 6/2005 Mohammed et al.
2005/0154965 A1 7/2005 Ichiki et al.
2005/0157793 A1 7/2005 Ha et al.
2005/0180415 A1 8/2005 Cheung et al.
2005/0185715 A1 8/2005 Karczewicz et al.
2005/0220188 A1 10/2005 Wang
2005/0238243 A1 10/2005 Kondo et al.
2005/0251856 A1 11/2005 Araujo et al.
2005/0259729 A1 11/2005 Sun
2005/0271140 A1 12/2005 Hanamura et al.
2006/0008038 A1 1/2006 Song et al.
2006/0013310 A1 1/2006 Lee et al.

(56) References Cited

U.S. PATENT DOCUMENTS

2006/0039470 A1 2/2006 Kim et al.
2006/0056689 A1 3/2006 Wittebrood et al.
2006/0066717 A1 3/2006 Miceli
2006/0140584 A1 6/2006 Ellis et al.
2006/0146940 A1 7/2006 Gomila et al.
2006/0150055 A1 7/2006 Quinard et al.
2006/0153217 A1 7/2006 Chu et al.
2006/0195864 A1 8/2006 New et al.
2006/0215014 A1 9/2006 Cohen et al.
2006/0215752 A1 9/2006 Lee et al.
2006/0247927 A1 11/2006 Robbins et al.
2006/0248563 A1 11/2006 Lee et al.
2006/0282774 A1 12/2006 Covell et al.
2006/0291475 A1 12/2006 Cohen
2007/0011702 A1 1/2007 Vaysman
2007/0036354 A1 2/2007 Wee et al.
2007/0064094 A1 3/2007 Potekhin et al.
2007/0065026 A1 3/2007 Lee et al.
2007/0080971 A1 4/2007 Sung
2007/0081522 A1 4/2007 Apelbaum
2007/0081587 A1 4/2007 Raveendran et al.
2007/0097257 A1 5/2007 El-Maleh et al.
2007/0121100 A1 5/2007 Divo
2007/0168824 A1 7/2007 Fukushima et al.
2007/0195893 A1 8/2007 Kim et al.
2007/0216777 A1 9/2007 Quan et al.
2007/0223529 A1 9/2007 Lee et al.
2007/0237226 A1 10/2007 Regunathan et al.
2007/0237232 A1 10/2007 Chang et al.
2007/0250754 A1 10/2007 Costa et al.
2007/0268964 A1 11/2007 Zhao
2007/0285505 A1 12/2007 Korneliussen
2008/0004731 A1 1/2008 Ozaki
2008/0037624 A1 2/2008 Walker et al.
2008/0043832 A1 2/2008 Barkley et al.
2008/0046939 A1* 2/2008 Lu et al. .......................... 725/90
2008/0069440 A1 3/2008 Forutanpour
2008/0072267 A1 3/2008 Monta et al.
2008/0077264 A1 3/2008 Irvin et al.
2008/0089414 A1 4/2008 Wang et al.
2008/0101403 A1 5/2008 Michel et al.
2008/0109369 A1 5/2008 Su et al.
2008/0109707 A1 5/2008 Dell et al.
2008/0126278 A1 5/2008 Bronstein et al.
2008/0134005 A1 6/2008 Izzat et al.
2008/0144553 A1 6/2008 Shao et al.
2008/0209300 A1 8/2008 Fukushima et al.
2008/0239354 A1 10/2008 Usui
2008/0250294 A1 10/2008 Ngo et al.
2008/0260042 A1 10/2008 Shah et al.
2008/0270528 A1 10/2008 Girardeau et al.
2008/0273591 A1 11/2008 Brooks et al.
2009/0006927 A1 1/2009 Sayadi et al.
2009/0007159 A1 1/2009 Rangarajan et al.
2009/0010325 A1 1/2009 Nie et al.
2009/0013086 A1 1/2009 Greenbaum
2009/0022157 A1 1/2009 Rumbaugh et al.
2009/0031390 A1 1/2009 Rajakarunanayake et al.
2009/0059067 A1 3/2009 Takanohashi et al.
2009/0059917 A1 3/2009 Lussier et al.
2009/0080510 A1 3/2009 Wiegand et al.
2009/0080523 A1 3/2009 McDowell
2009/0103635 A1 4/2009 Pahalawatta
2009/0122867 A1 5/2009 Mauchly et al.
2009/0125812 A1 5/2009 Blinnikka et al.
2009/0138784 A1 5/2009 Tamura et al.
2009/0141792 A1* 6/2009 Mori et al. ............... 375/240.01
2009/0144417 A1 6/2009 Kisel et al.
2009/0161763 A1 6/2009 Rossignol et al.
2009/0180537 A1 7/2009 Park et al.
2009/0187862 A1 7/2009 DaCosta
2009/0232217 A1* 9/2009 Lee et al. ................. 375/240.16
2009/0232401 A1 9/2009 Yamashita et al.
2009/0237728 A1 9/2009 Yamamoto
2009/0238277 A1 9/2009 Meehan
2009/0241147 A1 9/2009 Kim et al.
2009/0245351 A1 10/2009 Watanabe
2009/0249158 A1 10/2009 Noh et al.
2009/0254657 A1 10/2009 Melnyk et al.
2009/0268819 A1 10/2009 Nishida
2009/0276686 A1 11/2009 Liu et al.
2009/0276817 A1 11/2009 Colter et al.
2009/0307227 A1 12/2009 Prestenback et al.
2009/0307428 A1 12/2009 Schmieder et al.
2009/0322854 A1 12/2009 Ellner
2010/0021009 A1 1/2010 Yao
2010/0026608 A1 2/2010 Adams et al.
2010/0034268 A1 2/2010 Kusakabe et al.
2010/0040349 A1 2/2010 Landy
2010/0054333 A1 3/2010 Bing et al.
2010/0074536 A1* 3/2010 Hamada et al. ............... 382/218
2010/0077058 A1 3/2010 Messer
2010/0104021 A1 4/2010 Schmit
2010/0111410 A1* 5/2010 Lu et al. ........................ 382/166
2010/0122127 A1 5/2010 Oliva et al.
2010/0128170 A1* 5/2010 Hirai et al. .................... 348/441
2010/0149301 A1 6/2010 Lee et al.
2010/0153828 A1 6/2010 De Lind Van Wijngaarden et al.
2010/0171882 A1 7/2010 Cho et al.
2010/0186041 A1 7/2010 Chu et al.
2010/0192078 A1 7/2010 Hwang et al.
2010/0202414 A1 8/2010 Malladi et al.
2010/0220172 A1 9/2010 Michaelis
2010/0235583 A1 9/2010 Gokaraju et al.
2010/0235820 A1 9/2010 Khouzam et al.
2010/0290710 A1 11/2010 Gagvani et al.
2010/0293470 A1 11/2010 Zhao et al.
2010/0306413 A1* 12/2010 Kamay ......................... 709/247
2010/0306618 A1 12/2010 Kim et al.
2010/0309372 A1 12/2010 Zhong
2010/0309982 A1 12/2010 Le Floch et al.
2010/0316127 A1* 12/2010 Yokoyama ............... 375/240.16
2011/0002541 A1 1/2011 Varekamp
2011/0010629 A1 1/2011 Castro et al.
2011/0026591 A1 2/2011 Bauza et al.
2011/0032982 A1* 2/2011 Costa et al. .............. 375/240.02
2011/0033125 A1 2/2011 Shiraishi
2011/0047163 A1 2/2011 Chechik et al.
2011/0069890 A1 3/2011 Besley
2011/0093273 A1 4/2011 Lee et al.
2011/0103480 A1 5/2011 Dane
2011/0131144 A1 6/2011 Ashour et al.
2011/0158529 A1 6/2011 Malik
2011/0191374 A1 8/2011 Bengio et al.
2011/0194605 A1 8/2011 Amon et al.
2011/0218439 A1 9/2011 Masui et al.
2011/0219331 A1 9/2011 DeLuca et al.
2011/0255592 A1 10/2011 Sung et al.
2011/0258338 A1* 10/2011 Vass ............................. 709/233
2011/0268359 A1 11/2011 Steinberg et al.
2011/0279634 A1* 11/2011 Periyannan et al. ....... 348/14.09
2012/0013705 A1 1/2012 Taylor et al.
2012/0020408 A1 1/2012 Chen et al.
2012/0084821 A1 4/2012 Rogers
2012/0110443 A1 5/2012 Lemonik et al.
2012/0206562 A1 8/2012 Yang et al.
2012/0213280 A1 8/2012 Srinivasan et al.
2012/0232681 A1 9/2012 Mundy et al.
2012/0246343 A1 9/2012 Story, Jr. et al.
2012/0278433 A1 11/2012 Liu et al.
2012/0287999 A1 11/2012 Li et al.
2012/0314942 A1 12/2012 Williams et al.
2012/0324324 A1 12/2012 Hwang et al.
2013/0031441 A1 1/2013 Ngo et al.
2013/0039409 A1* 2/2013 Gupta ...................... 375/240.02
2013/0050254 A1* 2/2013 Tran et al. ..................... 345/629
2013/0114687 A1* 5/2013 Kim et al. ................ 375/240.03

(56) References Cited

U.S. PATENT DOCUMENTS

| | | | | |
|---|---|---|---|---|
| 2013/0198617 | A1 | 8/2013 | Maloney et al. | |
| 2013/0329810 | A1* | 12/2013 | Mese et al. | 375/240.26 |
| 2014/0369421 | A1* | 12/2014 | Zhu et al. | 375/240.26 |

FOREIGN PATENT DOCUMENTS

| | | |
|---|---|---|
| JP | 0715711 | 1/1995 |
| JP | 2008146057 | 6/2008 |
| JP | 2008225379 | 9/2008 |
| WO | WO0249356 | 6/2002 |
| WO | WO2007057850 | 5/2007 |
| WO | WO2008006062 | 1/2008 |

OTHER PUBLICATIONS

Ahn et al., Flat-region Detection and False Contour Removal in the Digital TV Display, http://www.cecs.uci.edu/~papers/icme05/defevent/papers/cr1737.pdf., ICME 2005.

Daly et al., Decontouring: Prevention and Removal of False Contour Artifacts, from Conference vol. 5292, Human Vision and Electronic Imaging IX, Jun. 7, 2004.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Notice of Allowance in related matter U.S. Appl. No. 13/095,975 mailed Jan. 29, 2014.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Chen, Yu, et al., "An Error Concealment Algorithm for Entire Frame Loss in Video Transmission," Picture Coding Symposium, 2004.

European Search Report for European Patent Application No. 08146463.1 dated Jun. 23, 2009.

Feng, Wu-chi; Rexford, Jennifer; "A Comparison of Bandwidth Smoothing Techniques for the Transmission of Prerecorded Compressed Video", Paper, 1992, 22 pages.

Friedman, et al., "RTP: Control Protocol Extended Reports (RTPC XR)," Network Working Group RFC 3611 (The Internet Society 2003) (52 pp).

Frossard, Pascal; "Joint Source/FEC Rate Selection for Quality-Optimal MPEG-2 Video Delivery", IEEE Transactions on Image Processing, vol. 10, No. 12, (Dec. 2001) pp. 1815-1825.

Hartikainen, E. and Ekelin, S. Tuning the Temporal Characteristics of a Kalman-Filter Method for End-to-End Bandwidth Estimation. IEEE E2EMON. Apr. 3, 2006.

International Search Report and Written Opinion Dated Aug. 13, 2012, in PCT/US2012/034426.

International Search Report and Written Opinion for International Application No. PCT/US2011/051818 dated Nov. 21, 2011 (16 pages).

International Search Report for International Application No. PCT/EP2009/057252 mailed on Aug. 27, 2009.

JongWon Kim, Young-Gook Kim, HwangJun Song, Tien-Ying Kuo, Yon Jun Chung, and C.-C. Jay Kuo; "TCP-friendly Internet Video Streaming employing Variable Frame-rate Encoding and Interpolation"; IEEE Trans. Circuits Syst. Video Technology, Jan. 2000; vol. 10 pp. 1164-1177.

Khronos Group Inc. OpenMAX Integration Layer Application Programming Interface Specification. Dec. 16, 2005, 326 pages, Version 1.0.

Korhonen, Jari; Frossard, Pascal; "Flexible forward error correction codes with application to partial media data recovery", Signal Processing: Image Communication vol. 24, No. 3 (Mar. 2009) pp. 229-242.

Li, A., "RTP Payload Format for Generic Forward Error Correction", Network Working Group, Standards Track, Dec. 2007, (45 pp).

Liang, Y.J.; Apostolopoulos, J.G.; Girod, B., "Analysis of packet loss for compressed video: does burst-length matter?," Acoustics, Speech and Signal Processing, 2003. Proceedings. (ICASSP '03). 2003 IEEE International conference on, vol. 5, No., pp. V, 684-7 vol. 5, Apr. 6-10, 2003.

Neogi, A., et al., Compression Techniques for Active Video Content; State University of New York at Stony Brook; Computer Science Department; pp. 1-11.

Peng, Qiang, et al., "Block-Based Temporal Error Concealment for Video Packet Using Motion Vector Extrapolation," IEEE 2003 Conference of Communications, Circuits and Systems and West Sino Expositions, vol. 1, No. 29, pp. 10-14 (IEEE 2002)

Roca, Vincent, et al., Design and Evaluation of a Low Density Generator Matrix (LDGM) Large Block FEC Codec, INRIA Rhone-Alpes, Planete project, France, Date Unknown, (12 pp).

(56) References Cited

OTHER PUBLICATIONS

"Rosenberg, J. D. RTCWEB I-D with thoughts on the framework. Feb. 8, 2011. Retrieved fromhttp://www.ietf.org/mail-archive/web/dispatch/current/msg03383.html on Aug. 1, 2011."
"Rosenberg, J.D., et al. An Architectural Framework for Browser based Real-Time Communications (RTC) draft-rosenberg-rtcweb-framework-00. Feb. 8, 2011. Retrieved fromhttp://www.ietf.org/id/draft-rosenberg-rtcweb-framework-00.txt on Aug. 1, 2011."
Scalable Video Coding, SVC, Annex G extension of H264.
Wikipedia, the free encyclopedia, "Low-density parity-check code", http://en.wikipedia.org/wiki/Low-density_parity-check_code, Jul. 30, 2012 (5 pp).
Yan, Bo and Gharavi, Hamid, "A Hybrid Frame Concealment Algorithm for H.264/AVC," IEEE Transactions on Image Processing, vol. 19, No. 1, pp. 98-107 (IEEE, Jan. 2010).
Yoo, S. J.B., "Optical Packet and burst Switching Technologies for the Future Photonic Internet," Lightwave Technology, Journal of, vol. 24, No. 12, pp. 4468, 4492, Dec. 2006.
Yu, Xunqi, et al; "The Accuracy of Markov Chain Models in Predicting Packet-Loss Statistics for a Single Multiplexer", IEEE Transaactions on Information Theory, vol. 54, No. 1 (Jan. 2008) pp. 489-501.
Nokia, Inc., Nokia Research Center, "MVC Decoder Description", Telecommunication Standardization Sector, Study Period 1997-2000, Geneva, Feb. 7, 2000, 99 pp.
Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Chen, Xing C., et al.; "Quadtree Based Adaptive Lossy Coding of Motion Vectors", IEEE 1996, 4 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Strobach, Peter; "Tree-Structured Scene Adaptive Coder", IEEE Transactions on Communications, vol. 38, No. 4, Apr. 1990, 10 pp.
Steliaros, Michael K., et al.; "Locally-accurate motion estimation for object-based video coding", SPIE vol. 3309, 1997, 11 pp.
Martin, Graham R., et al.; "Reduced Entropy Motion Compensation Using Variable Sized Blocks", SPIE vol. 3024, 1997, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Guillotel, Philippe, et al.; "Comparison of motion vector coding techniques", SPIE vol. 2308, 1994, 11 pp.
Orchard, Michael T.; "Exploiting Scene Structure in Video Coding", IEEE 1991, 5 pp.
Liu, Bede, et al.; "A simple method to segment motion field for video coding", SPIE vol. 1818, Visual Communications and Image Processing 1992, 10 pp.
Ebrahimi, Touradj, et al.; "Joint motion estimation and segmentation for very low bitrate video coding", SPIE vol. 2501, 1995, 12 pp.
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.
Chen, Michael C., et al.; "Design and Optimization of a Differentially Coded Variable Block Size Motion Compensation System", IEEE 1996, 4 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Nicolas, H., et al.; "Region-based motion estimation using deterministic relaxation schemes for image sequence coding", IEEE 1992, 4 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Office Action Mailed May 22, 2013 in co-pending U.S. Appl. No. 13/095,975, filed Apr. 28, 2011.
Office Action Mailed May 30, 2013 in co-pending U.S. Appl. No. 13/089,383, filed Apr. 19, 2011.
Office Action Mailed Jun. 5, 2013 in co-pending U.S. Appl. No. 13/095,971, filed Apr. 28, 2011.
Chae-Eun Rhee et al. (:A Real-Time H.264/AVC Encoder with Complexity-Aware Time Allocation, Circuits and Systems for video Technology, IEEE Transactions on, vol. 20, No. 12, pp. 1848, 1862, Dec. 2010).
Gachetti (Matching techniques to compute image motion, Image and Vision Computing, vol. 18, No. 3, Feb. 2000, pp. 247-260.
Sceen shot of website dated Oct. 14, 2011: www:abc.go.com/watch/2020/SH559026/VD55148316/2020.
Screen shot of website dated May 2011: www.cbs.com/primtime/60_minutes/video/?pid=Hwiua1litcOuuHiAYN.

* cited by examiner

REMOTE ACCESS ENCODING

TECHNICAL FIELD

This application relates to computer implemented applications.

BACKGROUND

A computing device may execute an operating environment that may include elements, such as file system objects and executing applications. The computing device may render a representation of the operating environment as part of a graphical interface, which may be output for presentation on a display unit of the computing device. The representation of the operating environment may be rendered at a defined display resolution, which may define a display area included in the graphical interface. Accordingly, it would be advantageous to provide high resolution video transmitted over communications channels having limited bandwidth.

SUMMARY

Disclosed herein are aspects of systems, methods, and apparatuses for remote access encoding.

An aspect is a method for remote access encoding. Remote access encoding may include receiving, at a host device, from a client device, a remote access request indicating a portion of a display area of an operating environment of the host device, rendering a representation of the portion of the display area, wherein rendering includes generating rendered content including a plurality of frames, generating an encoded block, and transmitting encoded content to the client device, wherein the encoded content includes the encoded block. Generating the encoded block may include identifying a current block from a plurality of blocks in a current frame, wherein the current frame is one of the plurality of frames, determining whether the current block is a static block, determining a coding quality for encoding the current block, and determining whether to encode the current block as a skipped block.

Another aspect is another method for remote access encoding. Remote access encoding may include receiving, at a host device, from a client device, a remote access request indicating a portion of a display area of an operating environment of the host device, rendering a representation of the portion of the display area, wherein rendering includes generating rendered content including a plurality of frames, generating an encoded block, and transmitting encoded content to the client device, wherein the encoded content includes the encoded block. Generating the encoded block may include identifying a current block from a plurality of blocks in a current frame, wherein the current frame is one of the plurality of frames, identifying a reference block from a plurality of blocks in a reference frame, on a condition that the reference block is a high quality reference block and the current block is a static block, encoding the current block as a skipped block and indicating that the skipped block is a high quality block, and on a condition that the reference block is a low quality reference block and the current block is a static block, encoding the current block as a skipped block and indicating that the skipped block is a low quality block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Remote access technologies, such as remote desktop or screen sharing, may allow a computing device (client) to remotely access an operating environment of another computing device (host). For example, the host device may render a representation of a display area of the operating environment, which may be associated with a defined resolution, and may transmit the rendered output to the client device for presentation on a display unit of the client device. Rendering the representation of the display area may include, for example, encoding the content of the display area as a series of frames, which may include video compression using one or more video compression schemes. Video compression schemes may include identifying temporal or spatial similarities between frames, or between blocks in a frame, and omitting repetitious information from the encoded output.

Content rendered for remote access may include significant areas of static content, wherein corresponding portions of consecutive frames remain unchanged and corresponding pixel values are identical. For example, elements of the operating environment, such as a background or an out of focus window, may remain static for two or more consecutive frames. Implementations of remote access encoding may improve coding efficiency and quality by increasing the likelihood that static content is compressed using high quality configuration, and encoding blocks including static content as skipped blocks. Portions including static content can be identified using a quality oriented technique. In some implementations, context information, such as information indicating movement of a window within the operating environment of the host device, may be used to identify portions to encode using high quality configuration.

Figure 1:
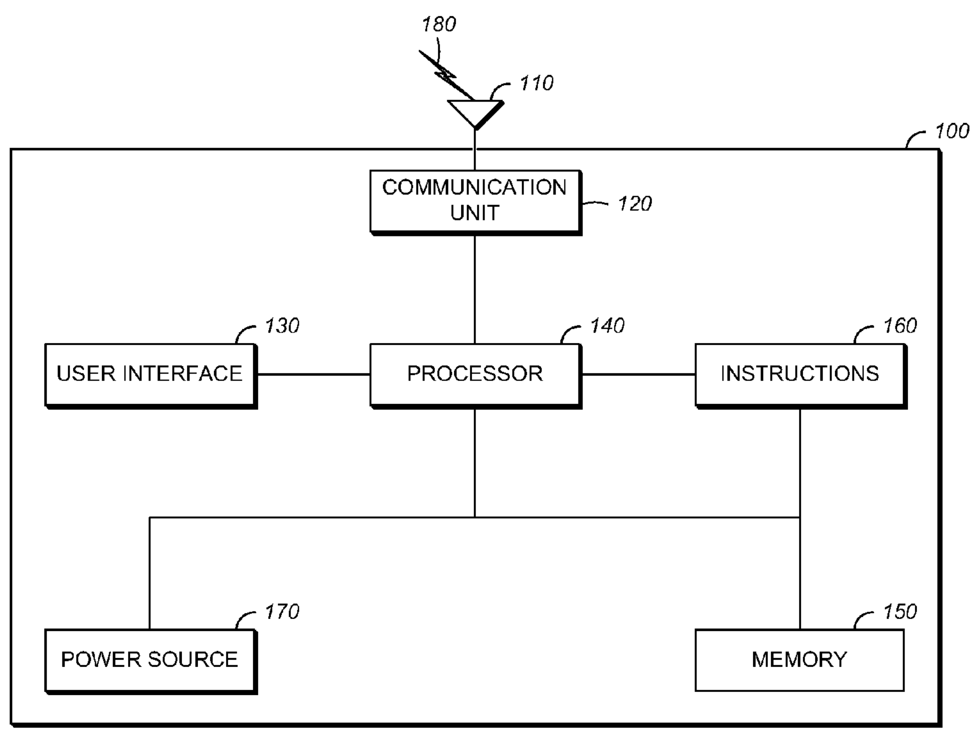
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
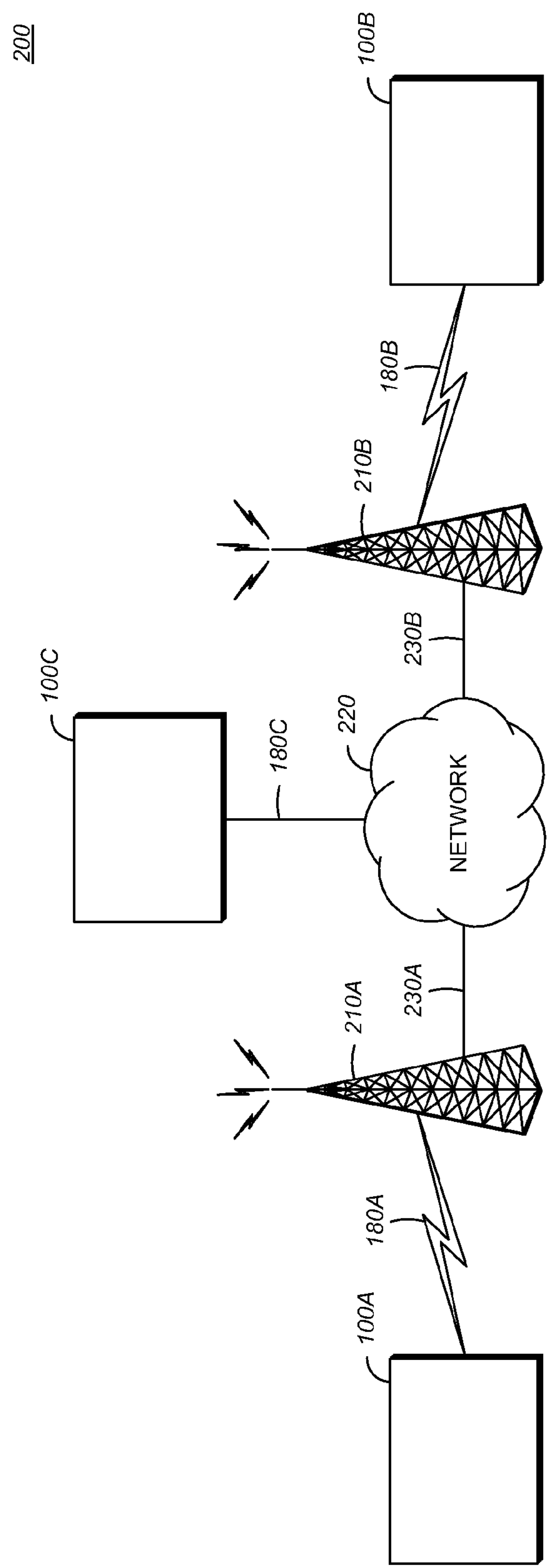
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
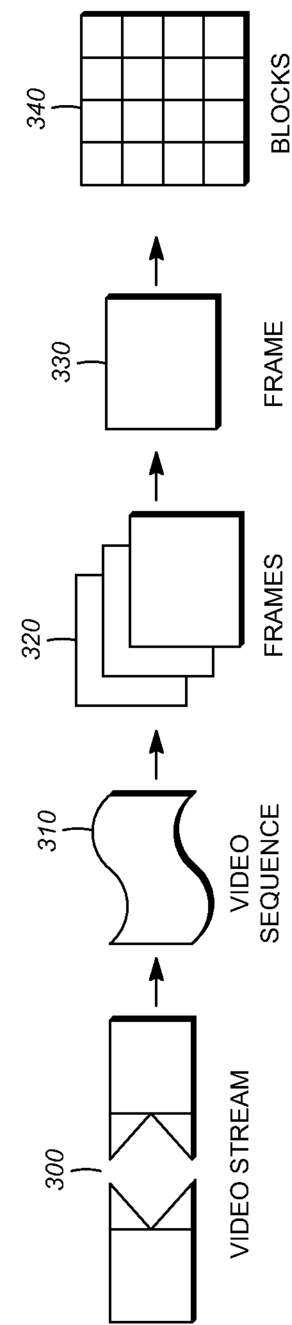
FIG. 3 is a diagram of a video stream for encoding and decoding in accordance with implementations of this disclosure.

FIG. 3 is a diagram of a video stream 300 for use in encoding and decoding in accordance with implementations of this disclosure. A video stream 300, such as a video stream generated by a host device during a remote desktop session, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
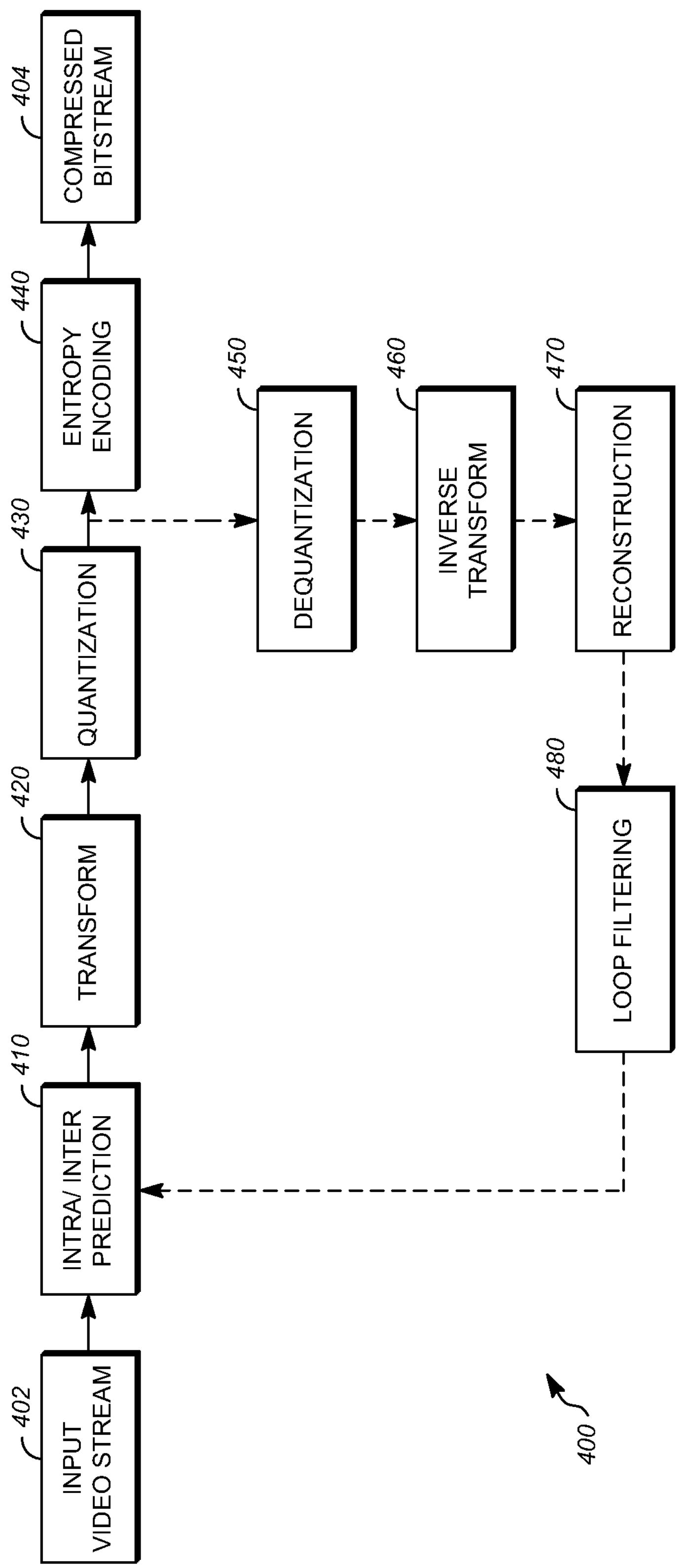
FIG. 4 is a block diagram of a video compression device in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
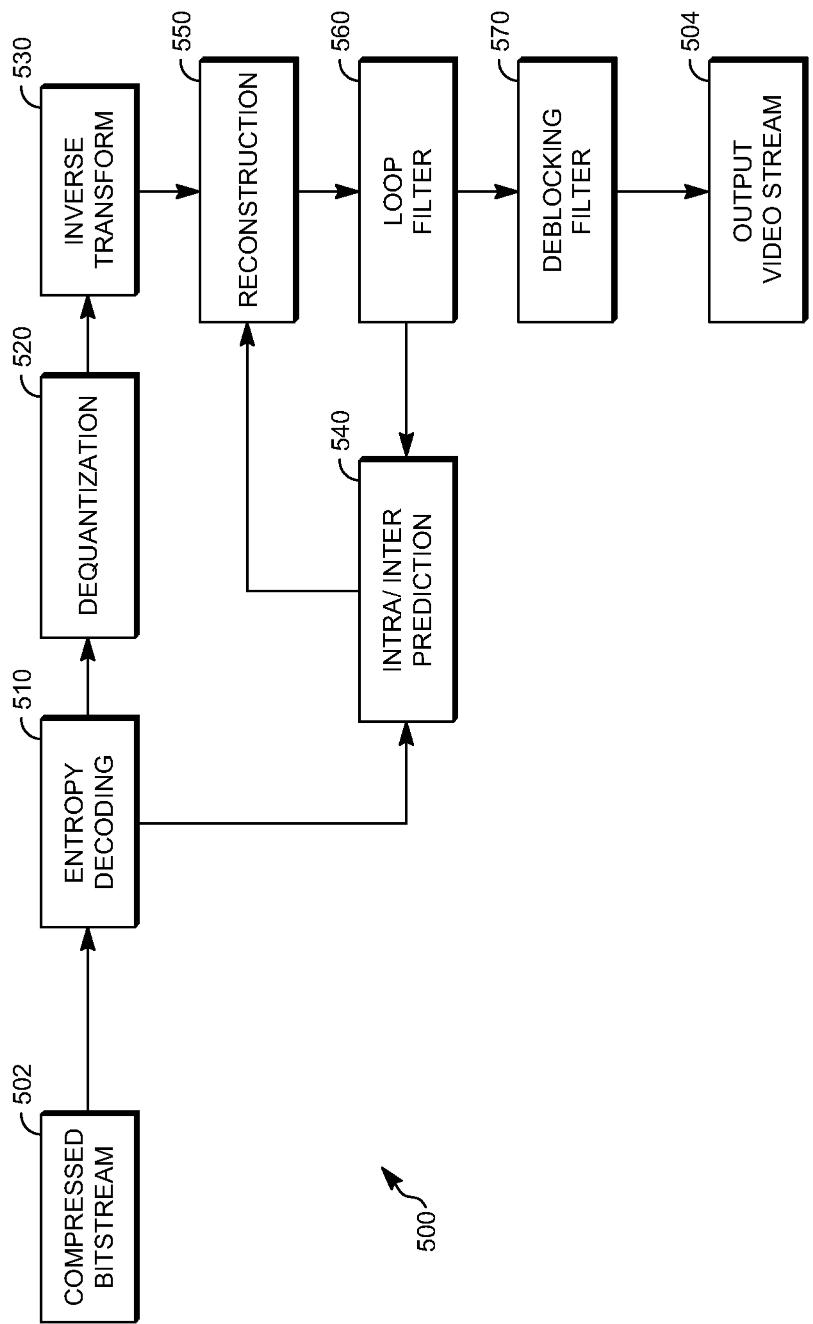
FIG. 5 is a block diagram of a video decompression device in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
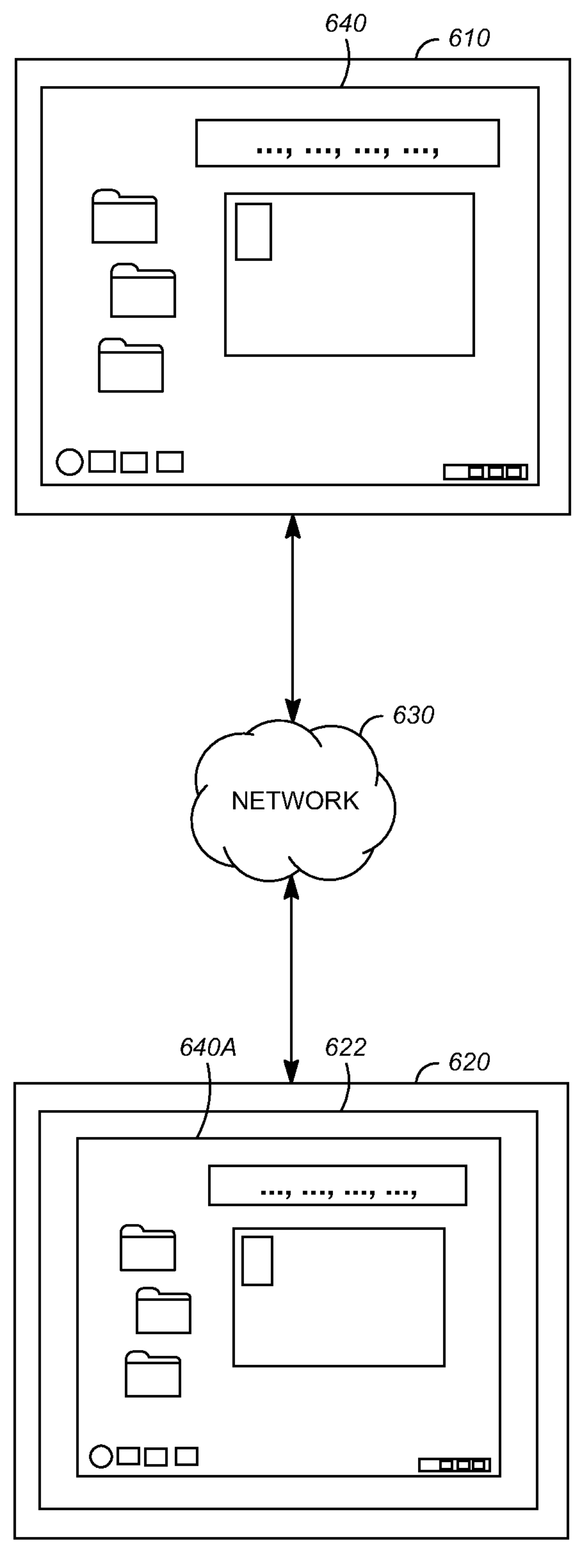
FIG. 6 is a diagram of remote access in accordance with implementations of this disclosure.

FIG. 6 is a diagram of remote access in accordance with implementations of this disclosure. Remote access may include a host device 610, which may be a computing device, such as the computing device 100 shown in FIG. 1 or the computing and communication devices 100A/100B/100C shown in FIG. 2, communicating with a client device 620, which may be may be a computing device, such as the computing device 100 shown in FIG. 1 or computing and communication device 100A/100B/100C shown in FIG. 2, via a network 630, such as the network 220 shown in FIG. 2.

Figure 7:
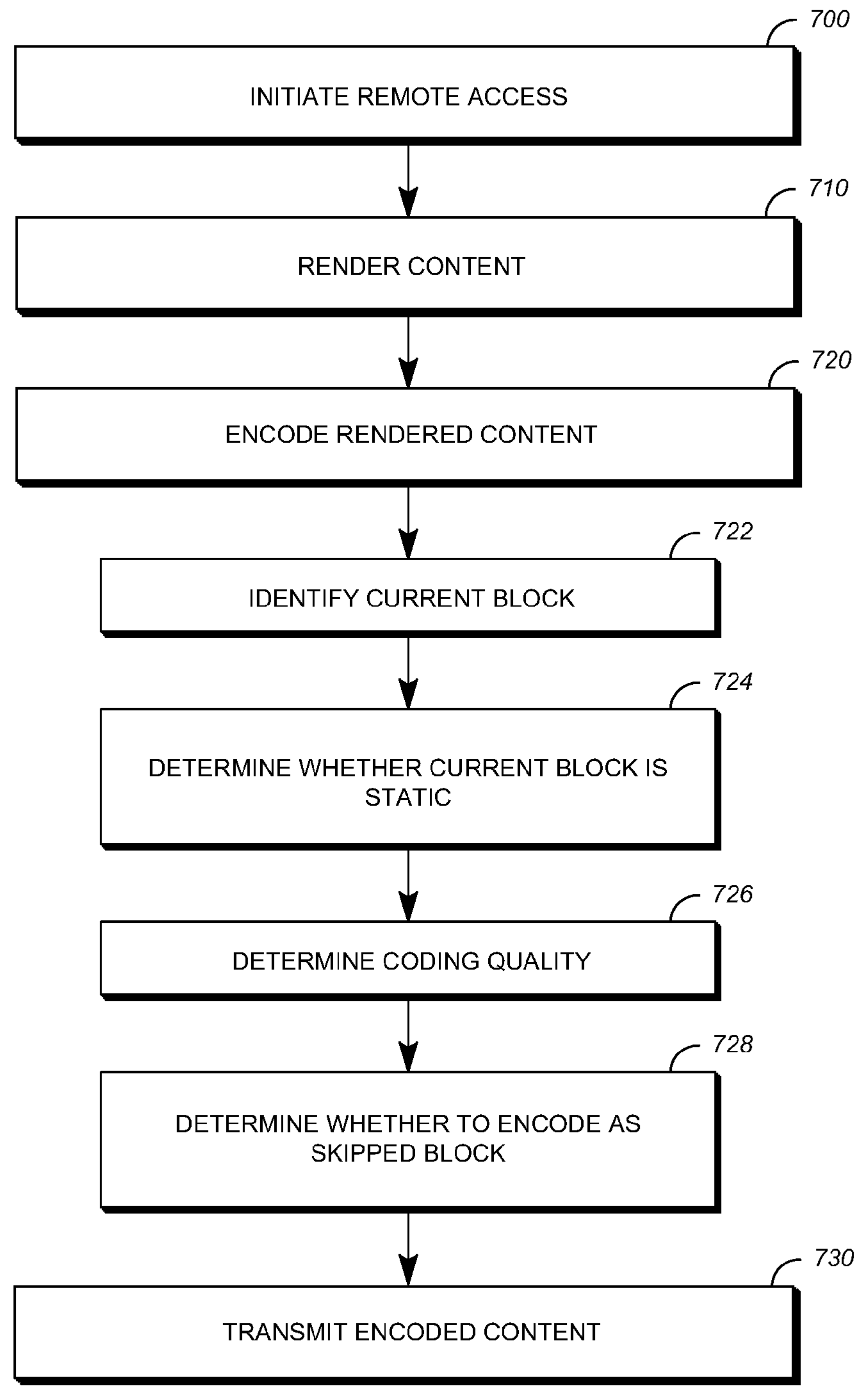
FIG. 7 is a diagram of remote access encoding in accordance with implementations of this disclosure.

The host device 610 may execute an operating environment, which may include an instance of an operating system and may be associated with an account, such as a logged in user account. As shown, a representation of the operating environment may include a display area 640. The display area 640 may indicate a height and a width of the representation of the operating environment. For example, the display area 640 may be associated with a defined display resolution, which may be expressed in physical units of measure, such as millimeters, or logical units of measure, such as pixels. For example, the display area 640 may have a display resolution of 1920 (width) by 1080 (height) pixels. The host device 610 may render the display area and may transmit the rendered content to the client device 620 via the network 630. In some implementations, the host device 610 may render the content as a series of frames, which may include an I-frame followed by one or more P-frames. The rendered content may be encoded and the encoded content may be transmitted to the client device 620. For example, the rendered content may be encoded as shown in FIG. 7.

The client device 620 may execute an operating environment, which may include a remote access application 622. The client device 620 may receive the rendered output from the host device 610 via the network 630 and may present the representation of the display area 640A via a graphical display unit of the client device 620.

In some implementations, the client device 620 may be configured to present the representation of the display area 640A at a display resolution that differs from the display resolution rendered by the host device 610. For example, the client device 620 may scale the rendered output for presentation via the graphical display unit of the client device 620. In some implementations, the host device 610 may receive an indication of the display resolution of the client device 620 and may render the representation of the operating environment using the display resolution of the client device 620.

For example, the host device 610 may adjust the display resolution of the host device 610 to match the display resolution of the client device 620, and may render the representation of the display area at the adjusted display resolution. Adjusting the display resolution may cause unwanted interference with the operating environment of the host device 610.

In another example, rendering the representation of the display are at the host device 610 may include scaling or sampling the representation of the display area to generate output at the display resolution of the client device 620, which may consume significant resources, such as processing resources, and may produce graphical artifacts.

FIG. 7 is a block diagram of remote access encoding in accordance with implementations of this disclosure. Remote access encoding may include a host device performing remote access, such as the remote access shown in FIG. 6, with a client device via a network. The host device may execute an operating environment. A representation of the operating environment may include a display area, which may include elements of the operating environment, such as windows, and window content. The host device may render the display area, encode the rendered content, and output the encoded content to the client device. In some implementations, remote access encoding may be performed by an encoder, such as the encoder 400 shown in FIG. 4, of the host device.

Rendered video, such as remote access video, may include relatively large amounts of static content, wherein pixel values remain static (do not change) from frame to frame. Static content may be compressed using high quality encoding. Quality and contextual metrics may be used to simplify and improve encoding performance. Implementations of remote access encoding may include initiating remote access at 700, rendering content at 710, encoding rendered content at 720, and transmitting the encoded content at 730. Although not shown separately, the client device may receive the encoded content, may decode the content, and may output the content to a local graphical display unit for presentation.

Remote access may be initiated at 700. Initiating remote access may include establishing a connection between the client device and the host device. The client device and the host device may exchange information for performing remote access. For example, the host device may receive a remote access request from the client device.

The host device may render a representation (rendered content) of the display area, or a portion of the display area, of the operating environment of the host device at 710. In some implementations, the host device may generate the rendered content as a sequence of frames. Each frame may include implicit or explicit information, such as the request identifier, offset information, buffer information, a timestamp, or any other information relevant to the rendered sequence of frames.

The host device may encode the rendered content at 720. Encoding the rendered content may include identifying a current block at 722, determining whether a block is a static block at 724, determining a coding quality for encoding a current block at 726, determining whether to encode the current block as a skipped block at 728, or a combination thereof.

A current block of a current frame may be identified for encoding at 722. For example, the representation of the display area of the operating environment may be rendered as video stream, such as the vides stream 300 shown in FIG. 3, and the encoding may include block based encoding, wherein a block of a frame of the video stream may be encoded based on, for example, a reference block in a previously encoded reference frame.

Remote access encoding may include determining whether a block is a static block at 724. In some implementations, a portion or portions of a rendered display area may be static (static content) from frame to frame. A block in a frame that includes content that is the same as the content of a corresponding reference block may be referred to as a static block. In some implementations, static blocks may be identified based on differences between blocks of a current frame and corresponding blocks of an unencoded (raw) frame corresponding to the reference frame identified for encoding the current frame. Blocks for which the difference between the current block and the corresponding block is within a threshold, which may be zero, may be identified as static blocks and may be assigned a zero motion vector. In some implementations, static blocks may be identified prior to, instead of, or as part of, performing motion estimation.

In some implementations, identifying static blocks may include using information indicating movement of an element of the operating environment. For example, the movement information may indicate motion of a window in the operating environment or motion, such as scrolling, of content within a window of the operating environment, such that the content changes location within the frame, but otherwise remains static. The motion information may be used identify a non-zero motion vector indicating the difference in location of the element between the current frame and the reference frame. Blocks including the static content may be identified as static blocks and may be assigned the non-zero motion vector.

Remote access encoding may include determining a coding quality for encoding a current block at 726. In some implementations, the coding quality of an encoded block may indicate differences between a current frame (raw frame) and a corresponding reconstructed frame. For example, the coding quality may be measured based on a sum of absolute differences (SAD) in the transform domain or spatial domain. For example, the SAD for an encoded block may be smaller than a threshold and the block may be a high quality block. Pixels in a high quality block may be referred to as high quality pixels.

In some implementations, determining a coding quality for encoding a current block may be based on a relative priority (importance) of the content included in the block. For example, video encoding may be subjected to resource utilization limitations, such as bit rate constraint, and content may be prioritized so that blocks including important content (important blocks) may be encoded using high quality encoding using a relatively large amount of resources (i.e., higher priority in bit allocation). Bits allocated for encoding important blocks, may not be used for encoding the important blocks and may be used for encoding other blocks. In some implementations important blocks may be encoded before other blocks. For example, a frame may be divided into slices and the important blocks may be included in a slice that may be encoded before other slices.

In some implementations, the priority for encoding a block may be based on the context of the content included in the block relative to the operating environment. For example, a topmost window in the operating environment may be relatively important to a user (in focus), and blocks of the rendered content including the topmost window may have a higher priority than other blocks. Blocks encoded using high quality encoding may suffer less quantization distortion than other blocks, convergence between a current frame and subsequent frames may be faster than for blocks that are not encoded using high quality encoding. Corresponding blocks in subsequent frames may be encoded as skipped blocks. Some subsequent frames may be encoded without encoding residual data. For example, encoding a first subsequent block may include encoding residual data and encoding other subsequent blocks may not include encoding residual data. In another example, priority may be based on the frequently and recency with which a window has been in focus, or interacted with by a user. The higher the focus frequency and recency, the higher the priority. For example, windows may be indexed in order of focus frequency, focus recency, or based on a combination of focus frequency and focus recency.

In some implementations, a static block may be encoded using high quality encoding. For example, encoding a static block as a high quality block may allow subsequent corresponding blocks to be encoded using fewer resources, which may reduce overall resource utilization (bit count). Bits utilized for encoding a static block as a high quality block can be used to improve the efficiency of encoding blocks which use the static block as a reference block. For example, a current block may be identified as a static block in a current frame, and the likelihood that a corresponding block in a subsequent frame is a static block may be high. In some implementations, the likelihood that the corresponding block in the subsequent frame is a static block may be particularly high when the current block does not include a portion of a topmost window.

Remote access encoding may include determining whether to encode the current block as a skipped block at 728. In some implementations, determining whether to encode the current block as a skipped block may be based on whether the current block is a static block, whether a reference block identified for encoding the current block is a high quality reference block, or a combination thereof.

In some implementations, determining whether to encode the current block as a skipped block may include determining whether a reference block for encoding the current block is a high quality reference block or a low quality reference block. For example, a reference block aligned with a block boundary and encoded using high quality encoding may be a high quality reference block; a reference block that overlaps multiple blocks that were encoded using high quality encoding may be a high quality reference block; and a reference block that overlaps with a block was not encoded using high quality encoding may be a low quality reference block.

In some implementations, encoding a static block using a high quality reference block may include identifying the current block as a skipped block, identifying a motion vector, indicating the reference block, and identifying the current block as a high quality block.

In some implementations, such as implementations where processing resources are limited, encoding a static block using a low quality reference block may include identifying the current block as a skipped block, identifying a motion vector indicating the reference block, and identifying the current block as a low quality block.

In some implementations, encoding a static block using a low quality reference block may include encoding the block without identifying the block as a skipped block, which may include using very good motion vector estimation. In some implementations, the encoder may utilize the motion vector directly in the coding process. In some implementations, the encoder may utilize the motion vector as a good starting point to find the best motion vector for coding the block.

Non-static blocks in the current frame may be encoded using a non-static block encoding technique, such as the encoding shown in FIG. 3.

Other implementations of the diagram of remote access encoding as shown in FIG. 7 are available. In implementations, additional elements of remote access encoding can be added, certain elements can be combined, and/or certain elements can be removed. Remote access encoding, or any portion thereof, can be implemented in a device, such as the computing device 100 shown in FIG. 1 or the computing and communication devices 100A/100B/100C shown in FIG. 2. For example, an encoder, such as the encoder 400 shown in FIG. 4, can implement remote access encoding, or any portion thereof, using instruction stored on a tangible, non-transitory, computer readable media, such as memory 150 shown in FIG. 1.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices described herein.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor"

should be understood as encompassing any of the foregoing hardware, either singly or in combination. The terms “signal” and “data” are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames, determining whether the current block is a static block, by determining that the current block is a static block on a condition that a difference between the current block and a corresponding raw reference block does not exceed a threshold and determining that the current block is not a static block on a condition that the difference between the current block and the raw reference block exceeds the threshold, wherein determining that the current block is a static block includes associating the current block with a zero motion vector, determining a coding quality for encoding the current block, and determining whether to encode the current block as a skipped block; and transmitting encoded content to the client device, wherein the encoded content includes the encoded block.

2. The method of claim 1, wherein determining whether the current block is a static block includes determining whether the current block includes static content.

3. The method of claim 1, wherein the raw reference block is one of a plurality of blocks in a raw reference frame, and wherein a position of the raw reference block in the raw reference frame corresponds with a position of the current block in the current frame offset by information indicating movement of a window in the operating environment, and wherein determining that the current block is a static block includes associating the current block with a non-zero motion vector.

4. The method of claim 1, wherein determining the coding quality for encoding the current block includes determining that the encoding quality is high quality on a condition that the current block is a static block.

5. The method of claim 1, wherein determining whether to encode the current block as a skipped block includes encoding the current block as a skipped block and indicating that the skipped block is a high quality block on a condition that a reference block for encoding the current block is a high quality reference block and the current block is a static block.

6. The method of claim 1, wherein determining whether to encode the current block as a skipped block includes encoding the current block as a skipped block and indicating that the skipped block is a low quality block on a condition that a reference block for encoding the current block is a low quality reference block and the current block is a static block.

7. The method of claim 1, wherein determining whether to encode the current block as a skipped block includes determining whether a reference block for encoding the current block is a high quality reference block.

8. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames determining whether the current block is a static block, determining a coding quality for encoding the current block, wherein determining the coding quality for encoding the current block includes determining that the encoding quality is high quality on a condition that the current block includes a portion of a topmost window of the operating environment, and determining whether to encode the current block as a skipped block; and transmitting encoded content to the client device, wherein the encoded content includes the encoded block.

9. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames determining whether the current block is a static block, determining a coding quality for encoding the current block, wherein determining the coding quality for encoding the current block includes determining that the encoding quality is high quality on a condition that the current block includes a portion of a recently in-focus window of the operating environment, and determining whether to encode the current block as a skipped block; and transmitting encoded content to the client device, wherein the encoded content includes the encoded block.

10. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames determining whether the current block is a static block, determining a coding quality for encoding the current block, wherein determining the coding quality for encoding the current block includes determining that the encoding quality is high quality on a condition that the current block includes a portion of a frequently in-focus window of the operating environment, and determining whether to encode the current block as a skipped block; and transmitting encoded content to the client device, wherein the encoded content includes the encoded block.

11. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames determining whether the current block is a static block, determining a coding quality for encoding the current block, and determining whether to encode the current block as a skipped block, wherein determining whether to encode the current block as a skipped block includes determining whether a reference block for encoding the current block is a high quality reference block, and wherein determining whether the reference block is a high quality reference block includes determining whether the reference block was encoded using high quality encoding based on a difference between a reference frame and a corresponding reconstructed frame, wherein the reference block is one of a plurality of blocks from the reference frame; and transmitting encoded content to the client device, wherein the encoded content includes the encoded block.

12. The method of claim 11, wherein determining whether the reference block was encoded using high quality encoding includes determining a sum of absolute differences in a transform domain or a spatial domain between the reference frame and the corresponding reconstructed frame, such that the reference block was encoded using high quality encoding on a condition that the sum of absolute differences does not exceed a threshold, and the reference block was encoded using low quality encoding on a condition that the sum of absolute differences exceeds the threshold.

13. The method of claim 11, wherein determining whether the reference block is a high quality reference block includes:

determining that the reference block is a high quality reference block on a condition that the reference block was encoded using high quality encoding and is aligned with a block boundary;

determining that the reference block is a high quality reference block on a condition that the reference block overlaps with a plurality of blocks that were encoded using high quality encoding; and determining that the reference block is a low quality reference block on a condition that the reference block overlaps with a block that was encoded using low quality encoding.

14. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames, identifying a reference block from a plurality of blocks in a reference frame, determining whether the current block is a static block, wherein determining whether the current block is a static block includes at least one of determining that the current block is a static block and associating the current block with a zero motion vector, on a condition that a difference between the current block and a corresponding raw reference block does not exceed a threshold, wherein the reference block is a decoded block based on the raw reference block, determining that the current block is a static block and associating the current block with a non-zero motion vector, on a condition that a difference between the current block and a corresponding raw reference block does not exceed a threshold, wherein the raw reference block is one of a plurality of blocks in a raw reference frame, and wherein a position of the raw reference block in the raw reference frame corresponds with a position of the current block in the current frame offset by information indicating movement of a window in the operating environment, or determining that the current block is not a static block on a condition that the difference between the current block and the raw reference block exceeds the threshold, on a condition that the reference block is a high quality reference block and the current block is a static block, encoding the current block as a skipped block and indicating that the skipped block is a high quality block, and on a condition that the reference block is a low quality reference block and the current block is a static block, encoding the current block as a skipped block and indicating that the skipped block is a low quality block; and transmitting encoded content to the client device, wherein the encoded content includes the encoded block.

15. The method of claim 14, wherein determining whether the current block is a static block includes determining whether the current block includes static content.

16. The method of claim 14, wherein generating the encoded block includes determining whether the reference block is a high quality reference block.

17. A method of remote access encoding, the method comprising:

receiving, at a host device, from a client device, a remote access request indicating a portion of a display area of an operating environment of the host device;

rendering a representation of the portion of the display area, wherein rendering includes generating rendered content including a plurality of frames;

generating an encoded block by:

identifying a current block from a plurality of blocks in a current frame, wherein the current frame is one of the plurality of frames, identifying a reference block from a plurality of blocks in a reference frame, determining whether the reference block is a high quality reference block, wherein determining whether the reference block is a high quality reference block includes at least one of determining whether the reference block was encoded using high quality encoding based on a difference between the reference frame and a corresponding reconstructed frame, determining that the reference block is a high quality reference block on a condition that the reference block was encoded using high quality encoding and is aligned with a block boundary, determining that the reference block is a high quality reference block on a condition that the reference block overlaps with a plurality of blocks that were encoded using high quality encoding, or determining that the reference block is a low quality reference block on a condition that the reference block overlaps with a block that was encoded using low quality encoding, on a condition that the reference block is a high quality reference block and the current block is a static block, encoding the current block as a skipped block and indicating that the skipped block is a high quality block, and on a condition that the reference block is a low quality reference block and the current block is a static block, encoding the current block as a skipped block and indicating that the skipped block is a low quality block; and transmitting encoded content to the client device, wherein the encoded content includes the encoded block.

* * * * *